3,366,464
METHOD OF COATING GRAPHITE WITH A REFRACTORY COATING AND PRODUCTS OBTAINED BY SUCH METHOD
Lucien Robert Guichet, Petit Clamart, and Georges Jacques Gotoghian, Paris, France, assignors to Societe Nationale d'Etude et de Construction de Moteurs d'Aviation, Paris, France, a company of France
No Drawing. Filed Dec. 12, 1963, Ser. No. 329,973
Claims priority, application France, Dec. 17, 1962, 918,872
5 Claims. (Cl. 29—191)

The present invention concerns the protection of elements made of graphite, such as are called upon to work at high temperatures, which may exceed 1800° K., and/or to withstand substantial thermic shocks. Such conditions are encountered notably in the rocket field, where it is necessary to protect graphite surfaces against erosion caused by the ejection of the products of combustion at very great speed.

Working at temperatures above 1800° K. leads to graphite being protected by a coating of refractory material such as tungsten, molybdenum, tantalum, zirconium, hafnium, niobium or titanium, in the form either of the element or of a compound such as the carbide, nitride or boride, the melting points for certain of these materials exceeding 3200° K.

These materials can be deposited on graphite by projection in the form of a jet of plasma or by any other method.

However, since graphite and these refractory materials have different coefficients of expansion, it has been found that the adhesion between the two bodies is poor and that the resistance to substantial thermic shocks is not satisfactory.

In accordance with the present invention there is formed on the surface of the graphite which is to be protected, a fixative intermediate layer or under-layer of small thickness of a substance chosen from the point of view of improving the adherence of the materials deposited subsequently. This substance is a mixture of the refractory material chosen for the coating, together with one or more metals of the group constituted by ruthenium, rhodium, palladium, osmium, iridium and platinum.

The amount of metal of this group may vary from 1% to 50% by mass (10% to 40% in the case of tungsten) of the refractory material in the mixture according to:

the nature of the coating material,
the desired fusibility of the mixture,
the temperature of treatment of the fixative underlayer (which may be anything between 2000° K. and more than 3000° K.), this temperature being higher as the proportion of refractory material in the mixture becomes greater,
the temperature at which the elements coated with refractory material deposited by a jet of plasma or by any other process are used.

The formation of the fixative under-layer is obtained by heating the graphite element, covered with the chosen mixture, in a furnace under vacuum or under a controlled atmosphere and by maintaining it at the desired temperature for several minutes.

Tests have shown that such a fixative underlayer has the following properties:

good wetting effect relatively to graphite,
rapid diffusion of its constituents into the interior of the graphite on account of physico-chemical reactions,
average coefficient of expansion, intermediate between those of graphite and of the coating material.

The elements obtained after depositing the coating material on the fixative under-layer can work at temperatures exceeding 1800° K.; they exhibit excellent adherence of the refractory coating and can withstand substantial thermic shocks. Very satisfactory results have been obtained in the case of coating with tungsten or with tungsten carbide (WC, $W_2C$).

The present invention finds an application of particular interest in the protection of rocket tubes.

We claim:

1. A method of providing an element of graphite with a refractory coating, consisting of forming on the graphite surface, a fixative intermediate under-layer consisting of a mixture of a refractory material chosen from the group consisting of tantalum, zirconium, molybdenum, hafnium, niobium, titanium and tungsten and their carbides, nitrides and borides, with at least one metal chosen from the group consisting of ruthenium, rhodium, palladium, osmium, iridium and platinum whereby the metal of the latter group is present in the mixture in an amount between 1% and 50% by mass of the refractory material, then depositing on this under-layer a coating of the said refractory material.

2. A method according to claim 1, in which the refractory material used is tungsten and the metal is at least one selected from the group consisting of ruthenium, rhodium, palladium, osmium, iridium and platinum, wherein the metal is present in an amount between 10% and 40% by mass of the tungsten.

3. A method according to claim 1, in which the fixative layer is formed by coating the graphite element with the said mixture and heating it in a furnace for several minutes.

4. An element of graphite having thereon a protective layer of a refractory material selected from the group consisting of tantalum, zirconium, molybdenum, hafnium, niobium, titanium and tungsten and their carbides, nitrides and borides and a fixative under-layer interposed between the graphite surface and said protective layer and made of a mixture of the said refractory material with a metal chosen from the group consisting of ruthenium, rhodium, palladium, osmium, iridium and platinum wherein the metal of the latter group is present in the mixture in an amount between 1% and 50% by mass of the refractory material.

5. A rocket tube having a graphite surface coated with a protective layer of a refractory material selected from the group consisting of tantalum, zirconium, molybdenum, hafnium, niobium, titanium and tungsten and their carbides, nitrides and borides on said surface and a fixative under-layer interposed between said surface and said protective layer and made of a mixture of the said refractory material with a metal chosen from the group consisting of ruthenium, rhodium, palladium, osmium, iridium and platinum wherein the metal of the latter group is present in the mixture in an amount between 1% and 50% by mass of the refractory material.

References Cited

UNITED STATES PATENTS

| | | | |
|---|---|---|---|
| 2,984,604 | 5/1961 | Duva et al. | 29—195 X |
| 3,024,522 | 3/1962 | Cacciotti. | |
| 3,122,424 | 2/1964 | King | 29—195 |
| 2,991,192 | 7/1961 | Halden et al. | 117—118 X |

ALFRED L. LEAVITT, *Primary Examiner.*

J. R. BATTEN, Jr., *Assistant Examiner.*